United States Patent
Prater

(10) Patent No.: US 10,582,604 B2
(45) Date of Patent: Mar. 3, 2020

(54) DEVICE AND METHOD FOR THE HEATING AND CONFINEMENT OF PLASMA

(71) Applicant: Daniel Prater, Muncie, IN (US)

(72) Inventor: Daniel Prater, Muncie, IN (US)

(*) Notice: Subject to any disclaimer, the term of this patent is extended or adjusted under 35 U.S.C. 154(b) by 232 days.

(21) Appl. No.: 15/686,821

(22) Filed: Aug. 25, 2017

(65) Prior Publication Data

US 2018/0063936 A1 Mar. 1, 2018

Related U.S. Application Data

(60) Provisional application No. 62/380,086, filed on Aug. 26, 2016.

(51) Int. Cl.
| H05H 1/11 | (2006.01) |
| H02K 1/00 | (2006.01) |
| G21B 1/05 | (2006.01) |

(52) U.S. Cl.
CPC ............... *H05H 1/11* (2013.01); *H02K 1/00* (2013.01); *G21B 1/05* (2013.01); *Y02E 30/126* (2013.01)

(58) Field of Classification Search
CPC ... H05H 1/11; H05H 1/14; H05H 1/46; H05H 2001/4622
USPC .......................... 335/299, 216, 296, 300, 301
See application file for complete search history.

(56) References Cited

U.S. PATENT DOCUMENTS

| 3,141,826 A | 7/1964 | Friedrichs et al. |
| 3,230,418 A | 1/1966 | Dandl et al. |
| 3,005,767 A | 10/1967 | Boyer et al. |
| 3,369,140 A | 2/1968 | Furth |
| 6,297,595 B1 | 10/2001 | Stimson et al. |
| 7,609,139 B2 | 10/2009 | Bird et al. |
| 2007/0210884 A1* | 9/2007 | Bird .................. H01F 7/202 335/80 |

(Continued)

OTHER PUBLICATIONS

Collins, C., "Spinning an Unmagnetized Plasma for Magnetorotational Instability Studies in the Plasma Couette Experiment", PhD Thesis, University of Wisconsin-Madison, (2013). Specifically Fig. 3.1 p. 47 and Section 3.2-3.2.1 p. 48-49 for using a static electric field and toroidally-localized (single, non-continuous) electrodes.

(Continued)

*Primary Examiner* — Wei (Victor) Y Chan
(74) *Attorney, Agent, or Firm* — Bruce J. Bowman

(57) ABSTRACT

A device and method for the heating of plasma by resonance using Halbach transformers for magnetic field modulation. Forming the Halbach transformers of heating to the primary magnetic field coils of confinement in a typical ring cusp confinement device configuration may reduce high-voltage breakdown along coil supports. By heating the plasma transverse to the confinement field a greater number of particle species may be retained. The primary confinement field coil support is placed outboard of the plasma cusp region by extending lobed flanges from the plates of Bitter-type primary electromagnetic field coils into the outboard region and placing the holes for the coil supports through these flanges. This arrangement of coil and flange moves plasma bombardment from the cusp region to the outboard region thus moving impurity generation by coil support bombardment from the cusp region to an outer radius where impurity effects are less detrimental.

16 Claims, 4 Drawing Sheets

(56) References Cited

U.S. PATENT DOCUMENTS

2015/0097487 A1* 4/2015 Prater .................. H05H 1/14
                                                      315/111.71
2017/0294239 A1* 10/2017 Makhlouf ............... G21B 1/05

OTHER PUBLICATIONS

Collins, C., et. al, "Stirring Unmagnetized Plasma", Physical Review Letters, v. 108, 115001, Mar. 16, 2002. Speciffically Figure 1 and paragraph spanning p. 115001-2 to 115001-3.

Dolan, T.J., "Magnetic Electrostatic Plasma Confinement." Plasma Physics and Controlled Fusion 36 (1994), pp. 1539-1593. Specifically Figure 8 and Section 3.5 for a linear set of ring cusps ("line cusp").

Berkowitz, J., et al. "Cusped geometries." Journal of Nuclear Energy (1954) 7.3 (1958): 292-293. Specifically Figures 4, 5, and 6 (specifically 6b) showing crossed B fields, crossed E and B fields, and a "line" cusp, respectively.

Post, R. F. "Symposium on new trends in unconventional approaches to magnetic fusion"; Stockholm (Sweden); Jun. 16-18, 1982; (Apr. 5, 1983) 24 p; UCRL--89018; CONF-830623-1; Available from NTIS, PC A02/MF A01 as DE83010064. Ref. Number 14785042. Specifically p. 14, 1st-4th paragraphs for multipole cusp with no electric field.

Ellis, R. F., et al. "Steady supersonically rotating plasmas in the Maryland Centrifugal Experimenta)." Physics of Plasmas (2005): 055704. Specifically Figures 1 and 2 showing a rotating plasma device.

Hassam, A. B. "Stability of magnetohydrodynamic Dean Flow as applied to centrifugally confined plasmas." Physics of Plasmas (1999): 3738-3743. Specifically Figure 1 showing the geometry of a rotating plasma.

Lehnert, B. "Rotating plasmas." Nuclear Fusion 11.5 (1971): 485. Specifically Figure 1, p. 490 for a diagram of a rotating plasma device, and Section 3.1, p. 515 for an account of rotating plasma devices.

Carden, P. O. "An historical review of the development of high-field electromagnets, particularly with regard to the theory of mechanical strength and the limits of performance." Reports on Progress in Physics 39.11 (1976): 1017. Specifically Figures 6, p. 1031 and 7, p. 1033 for a historical account of Bitter plate electromagnet design.

Hershkowitz, N., Dawson, J.M., "Fusion Reactor with Picket-Fence Walls", Nuclear Fusion, vol. 16, No. 6, p. 639-, 1976. Specifically the first two paragraphs and Figure 1.

Haines, M.G., "Plasma Containment in Cusp-Shaped Magnetic Fields", Nuclear Fusion, vol. 17, No. 4, 1977. Specifically Section 7.1, Multiple Line Cusps.

Abdrashitov, G.F. et al 1991 Hot Rotating Plasma in the PSP-2 Experiment Nuclear Fusion 31, 7.

Miley, G.F. 1976 Fusion Energy Conversion, American Nuclear Society.

Forest, C.B. et al 2015 The Wisconsin Plasma Astrophysics Laboratory Journal of Plasma Physics 81, 5.

Chen, F.F. 2011 An Indispensable Truth: How Fusion Power Can Save the Planet, Springer.

Cairns, R.A. 1991 Radiofrequency Heating of Plasmas, IOP Publishing Ltd.

Chen, F.F. 2006 Introduction to Plasma Physics and Controlled Fusion, vol. 1, Plasma Physics, Sprinter 2nd edition.

Maggs, J.E., Carter, T.A., Taylor, R.J. 2007 Transition from Bohm to classical diffusion due to edge rotation of a cylindrical plasma Physics of Plasmas 14, 052507.

Cooper, C.M., et al 2016 Direct measurement of the plasma loss width in an optimized, high ionization fraction, magnetic multi-dipole ring cusp Physics of Plasmas 23, 10, 102505.

Park, J., et al 2015 High-energy electron confinement in a magnetic cusp configuration Physical Review X 5, 021024.

Spalding, I., 1971 Cusp Containment Advances in Plasma Physics 4, 79-123.

Kaye, A.S. 1974 Plasma losses through an adiabatic cusp Journal of Plasma Physics 11, 1, 77-91.

* cited by examiner

DEVICE AND METHOD FOR THE HEATING AND CONFINEMENT OF PLASMA

CROSS-REFERENCE TO RELATED APPLICATIONS

This U.S. non-provisional patent application claims the benefit of and/or priority under 35 U.S.C. § 119(e) to U.S. provisional patent application Ser. No. 62/380,086 filed Aug. 26, 2016 titled "Device and Method for the Heating and Confinement of Plasma," the entire contents of which is specifically incorporated herein by reference.

FIELD OF THE INVENTION

The present invention relates in general to the subjects of ionized gas (plasma) devices, and devices and methods for plasma heating and specifically, to devices and methods for plasma heating and current drive in magnetic confinement devices possessing cusp-shaped magnetic fields.

BACKGROUND OF THE INVENTION

A certain class of open magnetic field topologies is generally suited for stable plasma confinement, namely cusps, however cusp confinement introduces its own challenges. Primary among these is the challenge of minimizing particle loss out through the cusp, but also practical challenges exist related to impurities, high-voltage breakdown, plasma heating, and methods to drive plasma currents.

Minimizing impurity buildup is generally necessary for generating and maintaining high plasma temperatures in low-atomic number plasmas of, for example, deuterium and tritium, and generally impurities form when hot dense plasma impinges on vessel structures such as antennae [Cairns 1991 pg. 42] and support structures [Dolan 1994]. High voltage breakdown can occur on these same elements when high voltages (thousands or millions of volts) across the confinement field are applied for, for example, cusp "plugging" by electrostatic fields [Dolan 1994], or rotation [Abdrashitov 1991].

Another challenge of high-energy plasma physics is plasma heating. Numerous methods exist to heat plasma such as neutral beam injection, electron beam injection, and microwaves. Alternatively radio-frequency resonance, for example ion cyclotron resonance heating (ICRH), comprises effective means for heating plasma to high temperatures such as those required for nuclear fusion and other uses [Cairns 1991].

Finally, it is generally favorable to be able to apply currents to the plasma and generally the means of doing so are related to heating means and thus heating and current drive are closely related [Cairns 1991].

It would be beneficial to those skilled in the art of cusped plasma confinement to have a means of supporting the field coils in such a way as to reduce exposure of the support to hot dense plasma for reducing impurity buildup and improving voltage holding, and that could additionally incorporate heating or current driving schemes.

SUMMARY OF THE INVENTION

Cusp reactors, for example linear sets of multiple ring cusps such as the Jupiter series of reactors [Dolan 1994], have the benefit of good magnetohydrodynamic stability.

Cusp reactors also have the benefit of being amenable to means of direct energy conversion by means of particle transport radially through open cusps into outboard regions containing electrostatic deceleration electrodes or other means [Miley 1976]. In this case coil support placement is important. Placement of the coil support through the field coil places it in contact with hot dense plasma in the cusp region between adjacent field coils. This provides a surface for ablation of coil support surface material into the plasma and introduction of high-Z impurities as well as a surface for high-voltage breakdown of potentials applied across field lines. Coating the support with low-Z materials such as Beryllium or other compounds is one present means for reducing plasma degradation by impurities [Cairns 1991 p. 42].

Disclosed herein is a means for minimizing impurity formation and improving voltage holding characteristics by placing the primary confinement field coil support outboard of the plasma cusp region by extending lobed flanges from the plates of Bitter-type primary electromagnetic field coils into the outboard region and placing the holes for the coil supports through these flanges. This arrangement of coil and flange moves plasma bombardment from the cusp region to the outboard region thus moving impurity generation by coil support bombardment from the cusp region to an outer radius where impurity effects are less detrimental.

By extending lobed flanges outboard from the primary Bitter-type electromagnetic field coils, the conductive material of the primary field coil can also be formed into additional secondary Bitter-type electromagnetic field coils that may serve to act as transformers. Termed "Halbach transformers" herein due to their similarity to the way that Halbach arrays of permanent magnets can add or remove magnetic field strength from one side of the array, stacked helical assemblies of lobed flanges formed into Bitter-type electromagnetic transformers provide an option for modulating the primary field inside the reactor at frequencies for heating or driving current. Resonant frequencies of, for example, ion cyclotron resonance, transit-time damping resonance, or at other frequencies, for heating, stirring, or otherwise manipulating the plasma are included herein by reference. By further integrating the modulations of Halbach transformers with the electrodes required for stirring the plasma a plurality of options for controlling plasma motion and behavior are made available including plasmoid formation.

DESCRIPTION OF THE DRAWINGS

The mentioned and other features and objects of this invention, and the manner of attaining them, will become more apparent and the invention itself will be better understood by reference to the following description of forms of the invention taken in conjunction with the accompanying drawings.

FIG. 1 is at an azimuth such that the plane of view intersects three Halbach transformers (104a, 104b, and 104c), given by helices to indicate their inductive nature, with outboard coil support 105 traversing axially through the center of the Halbach transformers. Arrows through the Halbach transformers indicates the manner by which magnetic field is directed through the Halbach transformers when the Halbach transformers are cycling to add magnetic field strength to the primary magnetic confinement field. Also indicated in FIG. 1 is the primary inner vacuum vessel region 106$i$ containing plasma 102 and secondary outer vacuum vessel region 106$o$. Outer vacuum vessel region 106$o$ contains electrostatic deceleration electrodes 107 which are connected by wires to energy absorption units (not shown) through vacuum vessel 108. Further indicated in FIG. 1 is a cylindrical coordinate axis showing for reference axial direction z, radial direction r, and azimuthal direction theta.

DETAILED DESCRIPTION OF THE INVENTION

Figure 1:
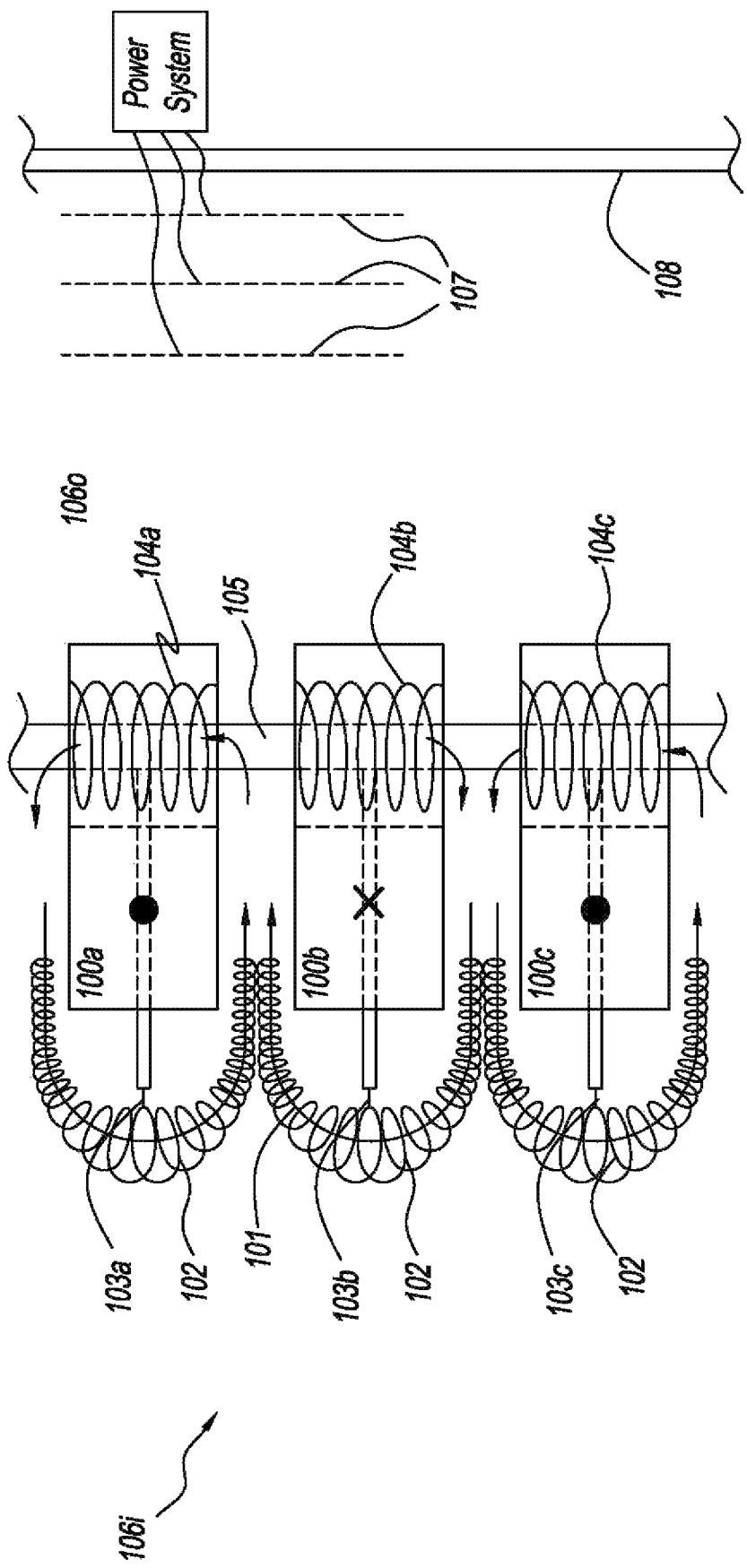
FIG. 1 is a cylindrical cutaway view along the cylindrical axis of a form of the device showing three magnetic field coils (100a, 100b, 100c) of any number of field coils, as indicated using common vector convention for field coil current (i.e., into page, x, out of page, dot). Adjacent coils are energized with currents opposing in direction along the device axial length to produce cusp-shaped magnetic fields with magnetic field line (101) directions as indicated by arrows following convention. The approximate location and shape of a plasma sheath 102, and approximate location of electrodes 103a, 103b, 103c, are indicated.
Figure 2:
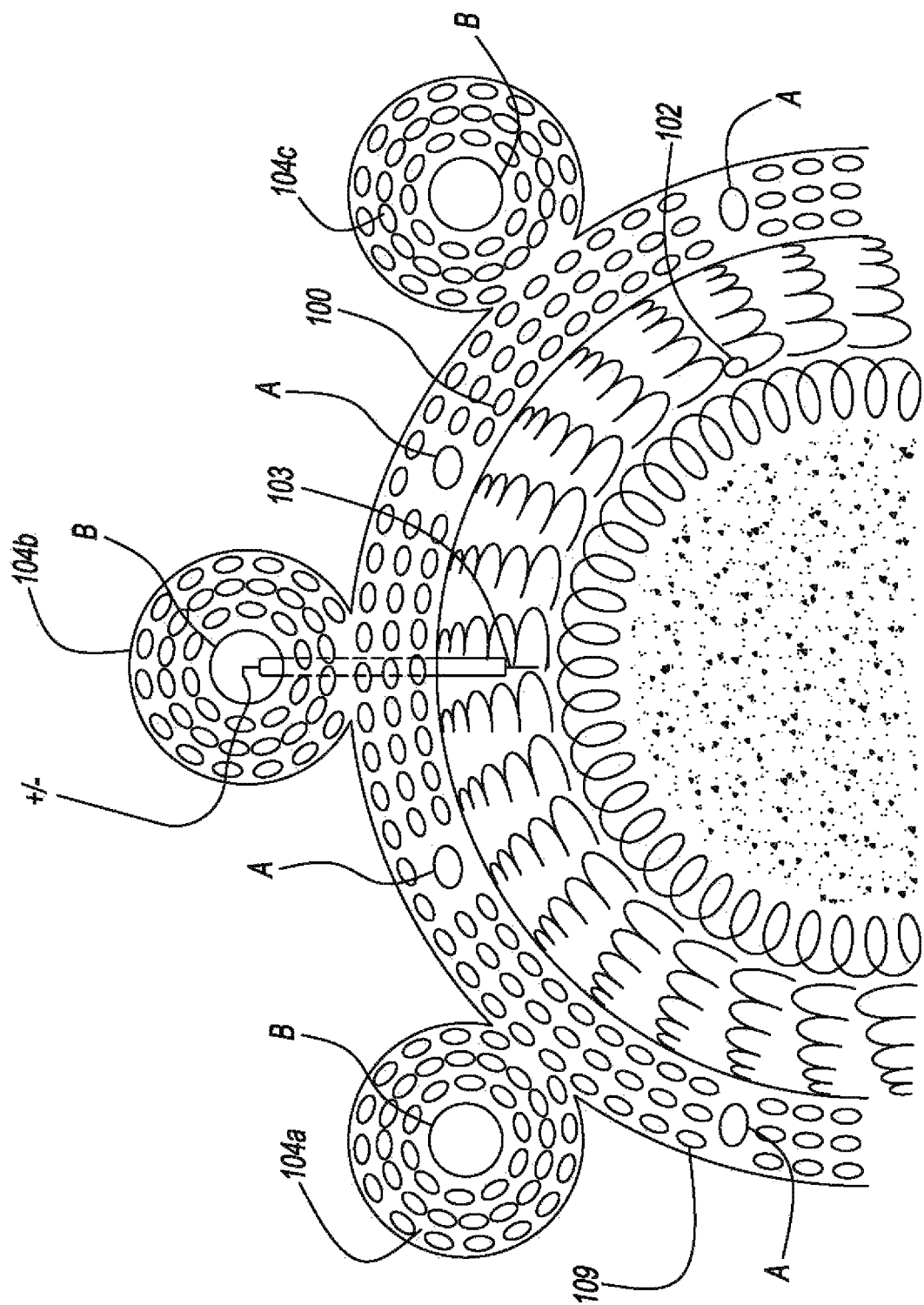
FIG. 2 depicts an axial view of a single (middle) plate of a combination field coil and Halbach transformer array assembly (not to scale). Shown is a single plate of field coil 100, plasma 102 with helical particle trajectories on magnetic field lines, electrode 103 with electrical connection and insulator material as is typical for electrodes, lobed flanges of conductive material for forming into Halbach transformers 104 of any number of Halbach transformers, channels 109 for the passage of cooling fluid, and slits 110 in the conductive material of the field coils 100 or lobed flanges for stacking helical assemblies for field coils or transformers, said transformers, called "Halbach transformers." High field-strength conventional-conductor (e.g., copper) magnetic field coils of the Bitter type are formed by adjoining a stack of such plates of conductive material in a spiraling fashion at dashed lines 110 (which may be anywhere around the circumference, see Bird et al U.S. Pat. No. 7,609,139 (which is specifically incorporated herein by reference). By including in each plate in the stack the material for additional Halbach transformers the location for the primary coil supports may be moved from radial positions A to positions B thereby moving the coil supports radially outboard of the cusp and diminishing field coil support exposure to hot dense plasma.
Figure 3:
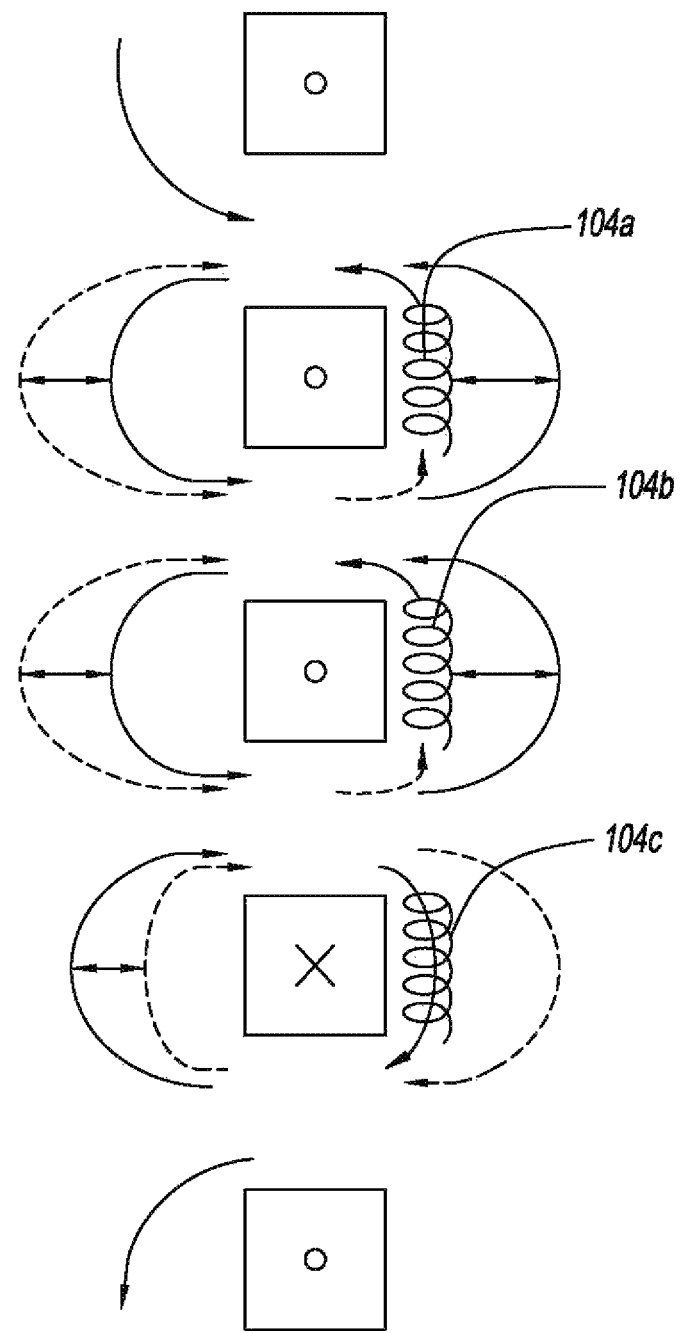
FIG. 3 illustrates one embodiment of ways that multiple Halbach transformers may modulate the primary confinement field and therefore the plasma in a multiplexed fashion along the device axial length. Solid and dashed lines and arrows indicate paths of magnetic fields and directions during a Halbach transformer cycle and double-headed arrows indicate the modulation of magnetic field lines during oscillation. In this example two Halbach transformers A and B are cycling out of phase with the primary confinement field such as to subtract magnetic field strength from the primary confinement field and A and B carry different currents and therefore different field modulations as indicated by the length of double arrows. In this case B carries greater current than A. Here also Halbach transformer C is modulating the primary field at 180 degrees out of phase of A and B and in phase with the primary confinement field such as to add magnetic field strength to the primary confinement field. In a similar manner any number of Halbach transformers may modulate any number of primary confinement fields in any combination of ways axially or around the field coil azimuth. The illustration in FIG. 3 is meant to serve as one example of multiplexing which may be enacted through multiple Halbach transformers around the circumference of the device or along its axis.
Figure 4:
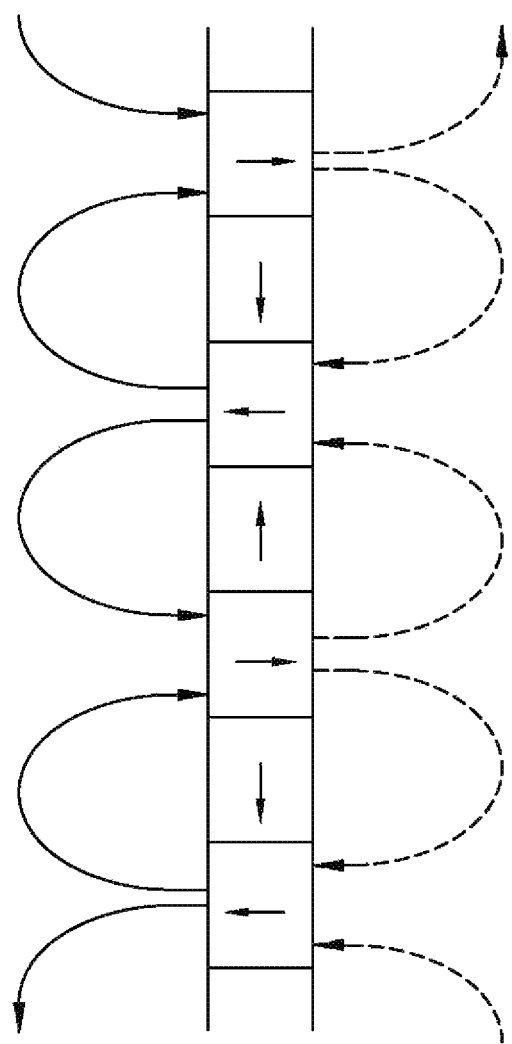
FIG. 4 is the common Halbach array diagram showing the direction of permanent magnet polarities leading to cancelation of the magnetic field on one side of the array of permanent magnets (dashed lines) and augmentation of the magnetic field on the other side of the array (solid lines).

Techniques and device configurations for cusped plasma reactors having edge-directed flow and having systems incorporating plasma heating and driving plasma currents are disclosed.

In one form, cusped magnetic fields are formed by at least three current-carrying magnetic field coils held in proximity along a shared cylindrical axis, each coil producing a magnetic field B opposite in polarity to its neighboring coils creating a cylindrical column of any number of cusp-shaped magnetic fields. Cusped magnetic fields are known to be a relatively stable means for plasma confinement as compared to closed systems such as the tokamak or field-reversed configuration and are well known to those skilled in the art.

In one form, the field coils surround a first vacuum region housing the hot dense plasma. In the cusp region between adjacent field coils the vacuum vessel may be closed axially and azimuthally by a wall, or in another form, at that radius be open axially and azimuthally into a second region of, in one embodiment, electrostatic deceleration electrodes or other means for direct energy conversion [Miley 1976]. Said open cusp configurations would thereby mean that the first primary vacuum vessel is bounded radially by a number of segments of vessel surfaces discontinuous in the axial direction with one another. Said segments house passageways through to the plasma for parts such as electrodes for stirring the plasma with an edge-directed torque, probes for measuring or diagnosing the plasma, antennae for heating or driving current in the plasma, or other parts. Such arrangements of parts are well known to those skilled in the art. The open cusp embodiment is beneficial for, for example, "ash" from nuclear fusion reactions to travel radially through to said second vacuum region outboard of the first region for electrostatic deceleration (direct energy conversion). In the open cusp configuration the whole vacuum region thereby comprises a first region wherein cusped fields bound plasma into a cusped configuration and a second vacuum region radially outboard and continuous with the first region through the cusp region, said second region having, for example, electrostatic deceleration electrodes.

Said segments of the first region likewise are parts of closed confinement systems but lack said second vacuum region by virtue of a wall in the cusp region and are thus closed to particle loss out through the cusp as compared to open systems. Examples of closed systems are the Jupiter-2M device built by Lavrent'ev in Russia [Dolan 1994] and the Wisconsin Plasma Astrophysics Laboratory WiPAL in Madison, Wis., USA [Forest 2015].)

In one form, electrodes are passed through the primary vacuum vessel wall segments. Typically the electrodes are positioned axially such that they intersect the outboard plasma edge at the low magnetic field regions midway points between cusps [Forest 2015]. Said electrodes polarities are set to potentials that alternate in polarity along the axial length of the device along analogous to the alternating direction of the magnetic field of the cusp configuration such that an azimuthal direction of fluid flow is created consistent in direction along the axial length (relative to the laboratory frame of reference) due to ExB particle drift [Chen 2006]. Electrode current across the magnetic field exerts a JxB torque that spins the plasma at its outer edge.

It would be additionally advantageous to eliminate electrode contact with the hot dense plasma in order to minimize impurities. By nature of their operation electrodes must touch the conductive plasma to conduct a current for providing the JxB torque at the plasma edge. Impurities will then sputter into the plasma as the electrode material is ablated. One means for eliminating the electrode may be the use of electrolasers. Said electrolasers can create a plasma channel through the vacuum magnetic field region outboard of the midplane between cusps. In this case said plasma channel can conduct the required current. In the present invention "electrode" may thereby mean also "electrolaser." In another embodiment of the present invention the plasma is spun by modulations of Halbach transformers.

Impurities may also be formed by plasma bombardment onto the supports for the field coils. Plasma impinging onto the supports also provides a surface for voltage breakdown. One means of reducing impurity formation and improving voltage handling is by moving the coil supports radially outward from the cusp. One means may be by housing the reactor in a very large radius vacuum vessel strong enough to support the opposing forces of the stack of opposed magnetic field coils at a radius large enough to also accommodate, for instance, electrostatic deceleration electrodes (typically 300 meters or more, Miley 1976). Another means of removing the field coil supports from contact with hot dense plasma is by forming into the magnetic field coils themselves lobed flanges that provide for axial passageways for the field coil supports. Such lobed flanges have the benefit of additional means for heating, stirring, or otherwise manipulating the plasma when stacks of lobed flanges are formed into helices of the Bitter electromagnet type.

Many high-energy plasma physics applications do not require the high cost and complexity associated with present-day superconductors. For example, nuclear fusion may be accomplished with as little as 1T of magnetic field (Chen, 2011, p. 206). With suitable design this magnetic field strength is approachable with conventional resistive electromagnets of the Bitter type.

In one form, the reactor field coils may be of the Bitter type, that is, formed of conventional conductor material (for example copper) plates arranged in a helical stack with each layer separated by an insulator as is well known to those skilled in the art. Room-temperature Bitter type electromagnets presently generate the world's strongest continuous magnetic fields at, for example, the National High Magnetic Field Laboratory (NHMFL) in Tallahassee, Fla., USA.

In one form, the reactor described herein will have a larger "central bore" than the Bitter-type used at, for example, NHMFL, and may be, for example, a meter or more in radius.

Forming the field coils by sheets of conductive material provides a means for placement of the coil supports at a location radially outboard of the high-field cusp region by the use of a plurality of lobed flanges on the outboard radius of the sheet of conductive material.

Said outboard lobed flanges may serve a plurality of functions. In one embodiment said lobed flanges may simply house the opening through which the coil supports that support the field coils pass axially. In another embodiment the lobed flanges may be segmented in the way that Bitter electromagnetic field coils are segmented for their helical stacking. In such a case of segmentation and helical stacking of the outboard lobed flanges additional Bitter-type electromagnet assemblies may be formed into, for example, transformers, or in the case of steady-state operation, means for augmenting the primary magnetic field. The transformer operation will be discussed. In one embodiment of the present invention Bitter-type electromagnets outboard and formed into the primary confinement field Bitter-type electromagnetic field coils may comprise transformers.

In one embodiment of the present invention these transformers modulate the primary confinement field. In such a case modulation through a duty cycle of the transformer adds and subtracts magnetic field strength from the primary confinement field within the first inner confinement vessel region in a manner analogous to the way that Halbach arrays of permanent magnets add or subtract magnetic field strength from one or the other side of an array of permanent magnets and therefore said transformers are called herein "Halbach transformers."

In one embodiment of the present invention, any number of Halbach transformers are placed radially outboard of any one or a plurality of the primary confinement field coils along the device axis or around its circumference to provide for a plurality of Halbach transformers arranged in an array around the device circumference and along its axis each being individually controllable. Halbach transformer arrays thereby permit a wide variety of multiplexing schemes along both the toroidal and axial directions for purposes of plasma heating, driving currents, plasmoid formation, or for other uses.

One simple example of the present invention plasma heating may be accomplished by modulating a circumferential array of Halbach transformers around the device axis in uniform phase at a frequency for ion cyclotron resonance. Plasma ions will thereby by heated preferentially transverse to the magnetic field and the plasma will be heated through collisions and subsequent dispersion as is well known to those skilled in the art.

Another example of plasma heating by Halbach transformers may be by transit time damping [Cairns 1991 pg. 24-25]. This heating scheme utilizes periodic modulation of the primary confinement field (in the present invention the cusp field) below the ion cyclotron frequency. The name comes from the fact that, when the collision frequency is small, the optimum power input is obtained when the coil modulation frequency is around the reciprocal of the average ion transit time through the region in which the field is modulated. This method of heating may be of value for cusp reactors, and in particular, cusp reactors with cross-field fluid motion such as Prater, U.S. Pat. No. 9,462,669.

In regards to driving currents in the plasma for, for example, plasmoid formation, Halbach transformers may be utilized to drive azimuthal currents by augmenting curved vacuum field and diamagnetic drift currents. By nature of the curvature and gradient of the magnetic field, cusped fields generate plasma drifts leading to currents in an azimuthal direction across the primary cusped field lines. Additionally, the plasma density gradient in the region of the cusp sheath (the outboard-most region of the plasma, a region well known to those skilled in the art) induces an azimuthal current due to plasma diamagnetic drift [Chen 2006]. Augmenting said curved vacuum field and diamagnetic drift currents by pulsed or continuous current drive, using Halbach transformers or radio-frequency antennae mounted on the inner primary vacuum vessel wall said antennae operating either with or without simultaneous Halbach transformer or stirring electrode current modulations, may permit plasmoid formation. Plasmoids may be, for example, toroidal plasma structures with dynamo properties, that is, self-sustaining currents and magnetic fields. Such dynamo plasmoid structures may be useful for further utility of said invention.

In the present invention the electrode potentials and magnetic fields are modulated or multiplexed in concert, for example through combined action of Halbach transformer modulations alongside electrode current modulations, for additional means of heating, stirring, driving current, or otherwise manipulating the plasma. Having spatial and temporal control of both current and magnetic field strength, for example through the control of multiple Halbach transformers and electrodes, thereby provides numerous possibilities for controlling plasma motion and behavior.

In another embodiment it may be found advantageous to decrease the Halbach transformer inductance by decreasing its total number of turns. One means of decreasing the number of turns is by not having a lobed flange segments extending from every layer of the primary field coil helical stack, for example, by utilizing lobed flanges on every other field coil layer, thereby having a Halbach transformer with fewer turns. Further means of increasing the frequency of electromagnetic resonance are well known to those skilled in the art.

Higher-frequency electromagnetic modulations than are capable by Halbach transformers may be desirable for heating or driving plasma current or other means. Examples of these frequencies are those in the range of, for example, ion cyclotron resonance, hybrid resonance, minority species resonance, or electron cyclotron resonance and require special antennae or coil structures in the primary vacuum vessel inner wall as is well known to those skilled in the art [Cairns 1991].

Other means of current drive may include, but are not limited to, neutral beam injection in a similar fashion as tokamak reactor current drive (but in cusp reactors toroidal current will be perpendicular to field lines rather than parallel to field lines as in the tokamak reactors), or electrolaser ionization of vacuum-region plasma for the creation of a plasma channel such that current may be conducted along said channel. In accordance with this embodiment said electrodes or electrolasers may combine current driving with stirring of the plasma fluid.

Heating, stirring, driving currents, or other plasma manipulations, may use parts that require passageways to the reactor primary inner vacuum region. Such passageways may be accessible by the use of advanced Bitter-type constructions such as the Split Florida-Helix Bitter-type electromagnet construction means (U.S. Pat. No. 7,609,139 B2 to Bird et al. which is specifically incorporated herein by reference) for the Halbach transformers or primary field coils. Additionally, the use of advanced Bitter-type electromagnet constructions provide for means of passing coolant through the Halbach transformers and primary field coils as well as provide means for radial passageways to the reactor interior from, for example, the inner part of the field coil support.

In one embodiment the cooling channels may be designed for the extraction of additional heat generated by, for example, nuclear fusion reactions. In a related embodiment, channels may be formed across the coil radius, for passing electrodes, diagnostic probes, or other parts to the reactor interior. Such cooling channels and radial passageways are features of advanced Bitter-type electromagnet construction means.

It is an object of the present invention to provide for increased plasma confinement by cusp reactors. Preferential transverse heating by, for instance ion cyclotron resonance or transit time damping heating by Halbach transformers, should decrease plasma losses out through the cusp. Cross-field fluid flow decreases cross-field ambipolar diffusion [Maggs 2007]. By itself this should decrease cusp losses [Cooper 2016], but also cross-field flow increases the pressure gradient at the sheath, and this should increase diamagnetic drift currents. These currents are in the same direction as curved vacuum field currents and oppose in adjacent cusp-field sheaths [Chen 2006]. Additionally high-beta (high plasma pressure relative to magnetic field pressure) confinement improves cusp losses [Park 2015]. Further the cusp sheath comprises a population of mirror-confined particles [Spalding 1971 and Kaye 1974]. Heating across field lines, for example at ion cyclotron resonance frequency, increases the radial-axial breadth of mirror-confined particle populations. The combined expansion of mirror-confined plasma species in the cusp sheath, coupled with a decrease in cross-field ambipolar diffusion to increase opposed sheath currents, and improved confinement at high beta, leads adjacent sheath currents to "choke" the cusp loss region to bulk plasma losses. Additional azimuthal current driven in the plasma may increase this effect. A current pulse driven azimuthally across field lines may generate plasmoids with dynamo action.

It should be well appreciated that various details of the present invention may be changed without departing from the spirit and scope of the invention. Furthermore, the foregoing description is for illustration only, and not for the purpose of limitation.

REFERENCES

Dolan, T. J. 1994 Magnetic Electrostatic Plasma Confinement *Plasma Physics and Controlled Fusion* 36, pp. 1539-1593, doi:10.1088/0741 3335/36/10/001.
Abdrashitov, G. F. et al 1991 Hot Rotating Plasma in the PSP-2 Experiment *Nuclear Fusion* 31, 7.
Miley, G. F. 1976 Fusion Energy Conversion, American Nuclear Society.
Prater, D. N. 2016 Plasma Confinement Device, U.S. Pat. No. 9,462,669.
Forest, C. B. et al 2015 The Wisconsin Plasma Astrophysics Laboratory *Journal of Plasma Physics* 81, 5.
Chen, F. F. 2011 An Indispensable Truth: How Fusion Power Can Save the Planet, Springer.
Cairns, R. A. 1991 Radiofrequency Heating of Plasmas, IOP Publishing Ltd.
Bird, M. D. et al 2009 Split Florida-Helix Magnet, U.S. Pat. No. 7,609,139 B2.
Chen, F. F. 2006 Introduction to *Plasma Physics and Controlled Fusion*, Volume 1, Plasma Physics, Sprinter 2nd edition.
Maggs, J. E., Carter, T. A., Taylor, R. J. 2007 Transition from Bohm to classical diffusion due to edge rotation of a cylindrical plasma *Physics of Plasmas* 14, 052507.
Cooper, C. M., et al 2016 Direct measurement of the plasma loss width in an optimized, high ionization fraction, magnetic multi-dipole ring cusp *Physics of Plasmas* 23, 10, 102505.
Park, J., et al 2015 High-energy electron confinement in a magnetic cusp configuration *Physical Review* X5, 021024.
Spalding, I., 1971 Cusp Containment *Advances in Plasma Physics* 4, 79-123.
Kaye, A. S. 1974 Plasma losses through an adiabatic cusp *Journal of Plasma Physics* 11, 1, 77-91.

What is claimed is:

1. A device for the heating and confinement of plasma comprising:
    a plurality of primary magnetic field coils circumferentially arranged to create a plurality of circumferentially arranged magnetic field cusps; and
    a plurality of lobed flanges extending radially outward from around the circumference of the primary magnetic field coils, the plurality of lobed flanges providing mechanical support of the plurality of primary magnetic field coils.

2. The device of claim 1, wherein each one of the plurality of primary magnetic field coils comprise a Bitter electromagnet.

3. The device of claim 2, wherein each one of the plurality of lobed flanges comprise a Bitter electromagnet.

4. The device of claim 1, further comprising a plurality of secondary magnetic field coils providing modulation of the plurality circumferentially arranged magnetic field cusps generated by the plurality of primary magnetic field coils.

5. The device of claim 4, wherein the plurality of secondary magnetic field coils provide modulation of the plurality of circumferentially arranged magnetic field cusps generated by the plurality of primary magnetic field coils at a frequency to induce plasma manipulations.

6. The device of claim 5, wherein plasma manipulations comprise at least one of plasma heating, current in the plasma, and plasma fluid flow.

7. The device of claim 4, wherein the plurality of secondary magnetic field coils provide multiplexed modulation of the plurality of circumferentially arranged magnetic field cusps generated by the plurality of primary magnetic field coils along an axis of the plurality of primary magnetic field coils to induce at least one of plasma heating, current in the plasma, and plasma fluid flow.

8. The device of claim 1, further comprising a plurality of electro-lasers positioned to induce torque onto the plasma.

9. A method for the heating and confinement of plasma comprising:
providing a plurality of primary magnetic field coils circumferentially arranged to create a plurality of circumferentially arranged magnetic field cusps; and
providing a plurality of lobed flanges extending radially outward from around the circumference of the primary magnetic field coils, the plurality of lobed flanges providing mechanical support of the plurality of primary magnetic field coils to create plasma.

10. The method of claim 9, wherein providing a plurality of primary magnetic field coils circumferentially arranged to create a plurality of circumferentially arranged magnetic field cusps includes providing each one of the plurality of primary magnetic field coils as a Bitter electromagnet.

11. The method of claim 10, wherein providing a plurality of lobed flanges includes providing each one of the plurality of lobed flanges as a Bitter electromagnet.

12. The method of claim 9, further comprising:
providing a plurality of secondary magnetic field coils to modulate the plurality circumferentially arranged magnetic field cusps generated by the plurality of primary magnetic field coils.

13. The method of claim 12, wherein providing a plurality of secondary magnetic field coils to modulate the plurality of circumferentially arranged magnetic field cusps generated by the plurality of primary magnetic field coils includes modulating at a frequency to induce plasma manipulations.

14. The method of claim 13, wherein plasma manipulations comprise at least one of plasma heating, current in the plasma, and plasma fluid flow.

15. The method of claim 12, wherein providing a plurality of secondary magnetic field coils includes providing multiplexed modulation of the plurality of circumferentially arranged magnetic field cusps generated by the plurality of primary magnetic field coils along an axis of the plurality of primary magnetic field coils to induce at least one of plasma heating, current in the plasma, and plasma fluid flow.

16. The method of claim 9, further comprising providing a plurality of electro-lasers to induce torque into the plasma.

* * * * *